INVENTOR.
PAUL J. GRUBER
ROLF GRZYMEK

United States Patent Office 3,309,821
Patented Mar. 21, 1967

3,309,821
AUTOMATIC WORK LOADING MECHANISM
FOR MACHINE TOOLS
Paul J. Gruber and Rolf Grzymek, Cincinnati, Ohio, assignors to The Cincinnati Milling Machine Co., Cincinnati, Ohio, a corporation of Ohio
Filed Aug. 21, 1964, Ser. No. 391,196
4 Claims. (Cl. 51—165)

This invention relates to automatic work loading mechanisms for use with machine tools and more particularly to an automatic work loading fixture for use with a precision grinding machine of a center-type and is especially suitable for use in such a machine with which in-process gauging is combined.

High production rate machines such as are employed to produce standard parts for the auto industry are conventionally supplied with automatic work loading and unloading mechanisms and in the more modern machines automatic in-process gauging is also supplied. This presents a problem in that both the parts loading mechanism and the gauge unit must reach into the same operating location where the workpiece is supported during the grinding operation. Consequently it has been necessary to provide complicated structures or modes of operation for one or the other of these two units to allow for their cooperative application to machines. The usual result has been rather large loading mechanisms built over or around the gauging units which makes the gauging units relatively inaccessible for adjustment and service. The loading mechanisms are also inconvenient to service and to adjust since they are complicated by provision for the gauges either inside them or somewhere close to their mechanism. The machines to which loading and gauging mechanisms are applied are used sometimes to produce several different parts of varied shapes and sizes. Therefore the loaders must be adjustable in some respects as, for example, for the length of pieces to be handled, and provision for these adjustments further complicates the loader or the gauge and in some cases both. These units can also become quite large as a result of their complexity and therefore sometimes hide the grinding operation from the view of the machine operator. Since grinding is still much of an art the isolation of the operation from the operator results in unnecessary scrap and considerable inconvenience.

It is therefore an object of this invention to provide an improved loading mechanism for a machine tool and particularly for center-type grinding machines which loading mechanism is relatively uncomplicated even when combined with automatic in-process gauging.

It is also an object of this invention to provide a loading mechanism in which all adjustable parts are accessible for convenient setting and service.

A further object is the provision of a combination of automatic loader and a gauging mechanism in which the construction of neither is complicated by the provision for the other and in which both are readily accessible to the machine operater with minimum interference.

Another object of this invention is to provide a loading mechanism in which adjustment for changes in work part size and configuration can be readily made for an extremely wide variety of sizes and shapes with the requirement of a minimum number of unique parts in the loader.

Still another object of this invention is the provision of an automatic loading mechanism that permits access to the work area by the operator with a minimum of interference.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

This invention is comprised of a wheel supported above the work table of a grinding machine and located between the centers of conventional headstock and footstock work supporting members which support a workpiece during grinding. The wheel is rotatable on an axis that is parallel to and spaced from the work axis which extends between the two work holding centers. The loader wheel includes a rim through which a plurality of work carriers are transversely received, each of the work carriers being adapted to hold a workpiece parallel to the work axis and the axis of wheel rotation at a radial distance from the latter axis equal to the spacing between the two axes. Therefore the workpieces are carried to a position in axial alignment with the centers as the wheel is rotated. The work carriers are equally spaced around the wheel and an indexing mechanism is provided to rotate the wheel in angular steps equal to the angular spacing. Releasable means are provided for securing the work carriers in the wheel rim and therefore the carriers can be adjusted transversely to change the transverse position relative to the wheel of the workpieces supported in the carriers. In the preferred form, the work carriers are provided with spaced pockets into which workpieces are placed and in which they are carried. To prevent the workpieces from falling from these pockets during movement around the lower part of path through which they are carried, the loader includes at least one retainer secured to the work table below the wheel and the retainer includes an arcuate surface extending in closely spaced relation with the lower portion of the workpiece path to hold the workpieces in the pockets. With this arrangement, the inside of the workpiece path is accessible on each side of the wheel and therefore the gauge unit is supported in a cantilevered manner from one or the other of the headstock and footstock work supporting members at a position inside the path and adjacent to the wheel but completely independent thereof. Preferably the wheel itself is supported by an arm extending outward and upward from the side of one of these work support members. The index mechanism is housed in the interior of that one work support member and is connected to the wheel through the arm to provide a clean and uncluttered mechanism. In this manner both the wheel and its associated work carriers and the gauge unit are readily accessible for adjustment and service and a minimum of loader structure and gauge support apparatus is presented before the operating area between the work holding members. A clear understanding of the construction and operation of loading and gauging mechanism can be obtained from the following detailed description in which reference is made to the attached drawings wherein:

Figure 1:
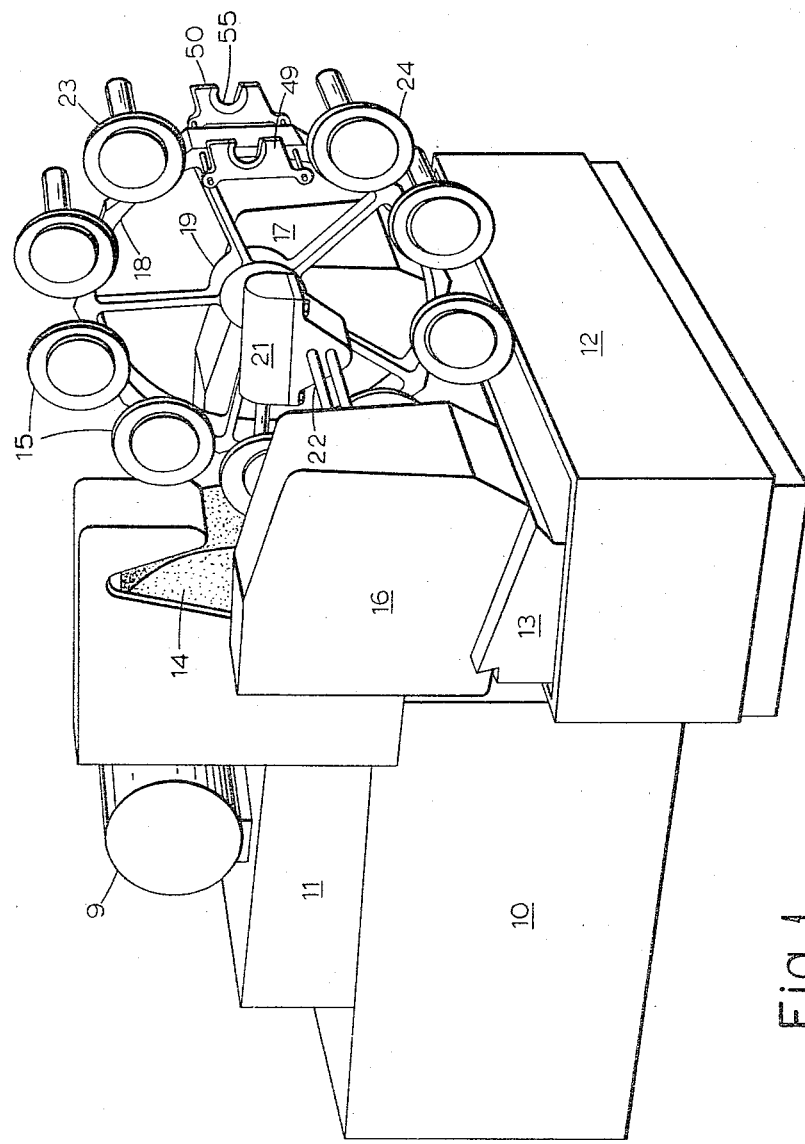
FIG. 1 is a perspective view of a center-type grinding machine equipped with the loading fixture of this invention.

The machine shown in FIG. 1 is a center-type grinding machine that is automated to produce repeated cyclic operations on a series of workpieces. The machine is comprised of a rear base 10 on which a wheel head 11 is slidably received for movement toward and away from a front base portion 12 on which a work table 13 is supported across the top. The wheel head 11 rotatably supports a grinding wheel 14 that is driven by a motor 9 and which is advanced and retracted intermittently to abrade successively workpieces 15 presented to the grinding wheel 14. The workpieces 15 are supported between a headstock 16 and a footstock 17, these two units comprising work supporting members which are secured onto the table 13. The workpieces 15 are supported prior to grinding in an automatic loading fixture which comprises a wheel 18 rotatably supported at a hub 19 between the headstock 16 and footstock 17. The wheel 18 is indexed in angular steps to present the workpieces 15 one at a time between the headstock 16 and footstock 17 where each workpiece 15 is picked up between centers 20, see FIG. 2, in the conventional manner. After a grinding operation, the workpiece 15 which has now been finished is carried away from the grinding area at the grinding wheel 14. The same loader wheel 18 by which the workpiece 15 was presented to the grinding wheel 14 in a preceding step now carries the finished workpiece 15 away and presents a new workpiece 15 to the grinding wheel 14. The machine shown is also equipped with an automatic in-process gauging unit 21. This gauge unit 21 is of the automatic jump on type and is located inside the path through which the workpieces 15 are moved during the grinding operation by the loading wheel 18. The gauge unit 21 is supported in a cantilever manner from the headstock 16 by means of support rods 22 that extend out from the side of the headstock 16 toward the wheel 18. As viewed in FIG. 1, the wheel 18 is intended to rotate in a counter-clockwise direction by equal angular steps so that workpieces placed onto the wheel 18 at the location 23 indicated are carried to the grinding wheel 14 and then carried away from the grinding wheel 14 below the loader wheel 18 to the position 24 where they are unloaded from the wheel 18 and removed therefrom as finished workpieces. The mechanism placing the workpieces 15 onto the wheel 18 is not shown but can be of any conventional conveyor type in which an escapement mechanism is tripped at each index movement of the wheel 18 to permit one workpiece to roll onto the wheel 18 or the workpieces might be manually placed onto the wheel 18. The workpieces at the position 24 are permitted to roll off and away from the wheel 18 onto a conveyor, not shown, of any conventional type which is adapted to carry these finished workpieces away from the machine.

Figure 2:
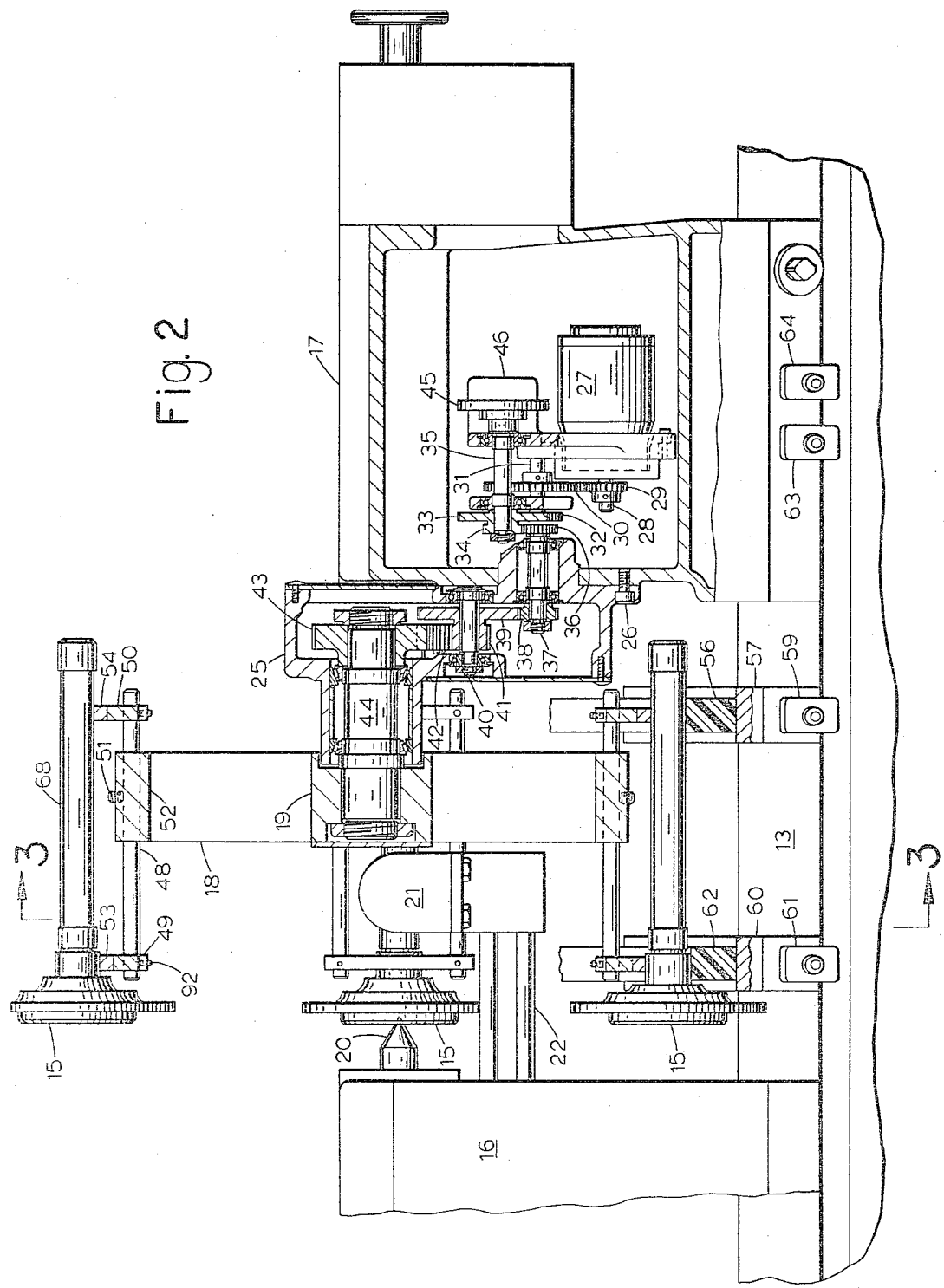
FIG. 2 is a longitudinal section through the loader mechanism.

The manner in which the wheel 18 is supported between the headstock 16 and the footstock 17 is shown best in FIG. 2. The wheel 18 is rotatably supported by an arm member 25 that is attached securely to the side of the footstock 17 by machine screws 26. The arm 25, shown also in FIG. 3, extends outward and upward from the side of the footstock 17 and the indexing mechanism which rotatably steps the wheel 18 is included in the footstock 17 and is connected to the wheel 18 through the arm 25. This mechanism includes a hydraulic motor 27 which powers the indexing movement. The motor 27 rotates a shaft 28 extending therefrom and on which a gear 29 is fixed. The gear 29 is in mesh with a gear 30 that is fixed on a shaft 31 and drives that shaft. A second gear 32 is fixed on end of shaft 31 and is engaged with a gear 33 which is fixed on another shaft 35 spaced from and parallel to the shaft 31. A second gear 34 is fixed on the shaft 35 and this gear is in turn in mesh with a gear 36 that is fixed on a shaft 37 that extends outward from the footstock 17 and into the arm 25. A gear 38 is fixed on a shaft 37 in the arm 25 and is engaged with a gear 39 that is fixed on an idler shaft 40 also inside the arm 25. The idler shaft 40 as a second gear 41 thereon which engages with a gear 42, shown only partly in FIG. 2 due to the staggered arrangement of the gears and shafts described, and the gear 42 is in mesh with and drives a gear 43 which is fixed on the end of a shaft 44 extending into the arm 25 at its outward end. The shaft 44 is rotatably held in the end of the arm 25 and extends outward therefrom and the hub 19 of the wheel 18 is firmly secured thereto. Thus it can be seen that the wheel 18 is supported between the headstock 16 and the footstock 17 and above the table 13 for rotation at that location by a mechanism which is enclosed completely in the footstock 17 and the arm 25.

The shaft 35 in the drive train between the motor 27 and the wheel 18 is rotated by the motor 27 at the same time the wheel 18 is indexed. A cam 45 is fixed onto the shaft 35 at a position where it is engaged by a hydraulic control unit indicated as 46 which will be described in detail later herein. The hydraulic control unit 46 determines the angular movement of the wheel 18 by effecting the operation of the motor 27 for a predetermined amount of rotation.

Figure 3:
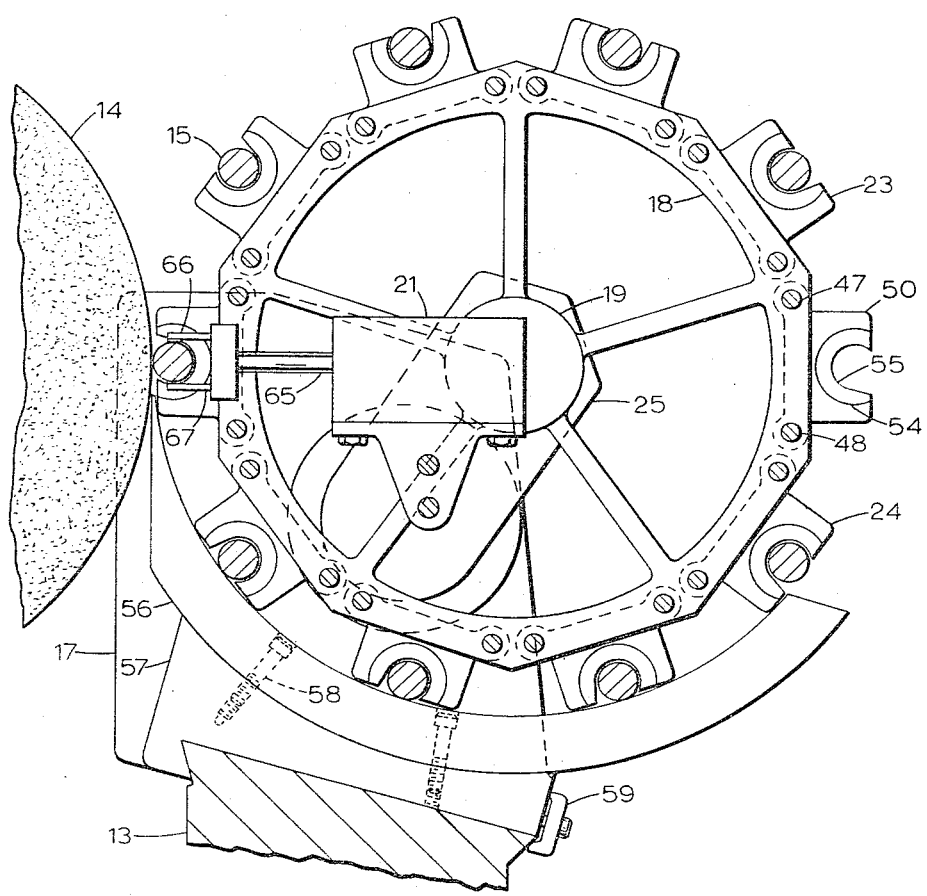
FIG. 3 is a transverse section of the mechanism taken on the plane of FIG. 2 indicated as 3—3.

The work carrier units by which the workpieces 15 are supported on the wheel 18 and carried to the work area at the wheel 14 are shown best with reference to both FIGS. 2 and 3. Each of the work carriers is comprised of a pair of rods 47 and 48 which extend transversely through the wheel 18 at its outer rim portion 52. At the ends of the rods 47 and 48 on opposite sides of the wheel rim 52, a pair of pocket members 49 and 50 are attached to the rods 47 and 48 and these pocket members 49, 50 carry the workpieces 15. The rods 47 and 48 are each releasable for adjustment through the rim 52 by removal of a set screw 51 threaded into the rim 52 and bearing against the rods 47 and 48. In this manner the extension of the rods 47 and 48 on one side or the other of the rim 52 can be adjusted. Similarly each of the pocket members 49 and 50 is adjustable along the rods 47 and 48 after the removal of set screws 92 which are threaded through the pocket members 49 and 50 and bear against the rods 47 and 48. Therefore the spacing of the pocket members 49 and 50 can be adjusted on the rods 47 and 48. The pocket members 49 and 50 each have an insert 53 and 54, respectively, fixed therein which inserts have a pocket shaped opening 55 that is adapted to loosely receive and support a workpiece 15 as the wheel 18 is indexed rotatably position to position. These inserts 55 are removably placed in the pocket members 49 and 50 so that the diameter of workpiece to be accommodated by the carriers can be altered merely by removing the inserts 55 and replacing them with other inserts having pockets 55 of other dimensions. From this it can be seen that the work carriers not only can be altered conveniently to accommodate workpieces of different diameters but the workpieces can be of varying length and the pocket members 49 and 50 can be adjusted to accommodate these varying lengths. Also the axial position of the workpieces 15 relative to the wheel 18 can be adjusted very simply by altering the position of the rods 47 and 48 through the rim 52. Thus it can be seen that the work carriers are adapted for convenient alteration with a minimum of effort and a minimum number of unique parts therein. These unique parts include only the inserts 53 and 54 which are received in the pocket members 49 and 50 respectively. Of course for longer workpieces the rods 47 and 48 can be replaced with longer rods but these rods are of standard bar stock and are very inexpensively obtained.

With reference to FIG. 3 it can be seen that the workpieces 15 must be retained in the pockets 55 as the wheel is indexed to carry the workpieces 15 through the space between the loading wheel 18 and the table 13. Therefore a retainer unit is shown in FIG. 3 attached to the top of the table 13 to retain the workpieces 15 in the pockets 55. The retaining unit is comprised of an arcuate member 56 secured in a support member 57 by screws 58 and the member 57 is in turn held securely to the table 13 by a clamp 59. The arcuate member 56 of the retaining unit includes a surface which extends beneath the loading wheel 18 and in close proximity around the path through which the workpieces 15 are carried as the wheel 18 is indexed. The arcuate retaining member 56 therefore engages the workpieces 15 while they are in the pockets 55 and prevents the workpieces 15 from tumbling from those pockets as the loading wheel 18 is indexed to carry them through the space between that wheel 18 and table 13. The arcuate member 56 is, in the preferred form, made from a plastic such as nylon or other relatively soft material which will not mar the workpieces 15 as they are moved along the arcuate surface thereof. The member 56, of course, is a unique part and must be adapted for the particular workpiece which is to be carried by the loading mechanism. However it is made of inexpensive material and need not be machined to close tolerances. The workpieces 15 in the specific embodiment shown are relatively long and therefore, as revealed in FIG. 2, two of the retaining units are provided. The second is shown comprised of the support member 60 secured to the table 13 by a clamp member 61 and an arcuate member 62 similar to the arcuate member 56 extends into close proximity to the path through which the workpieces 15 are moved. The member 62 and its arcuate surface are slightly different from the member 56 since the diameter of the workpieces 15 at which the member 62 contacts is slightly larger than the diameter at which the member 56 contacts.

As is apparent from FIGS. 1, 2 and 3, the loading mechanism described presents a minimum of mechanism in front of the grinding wheel 14. In addition it can be seen that access is freely available to the interior of the path traced by the workpieces 15 as they are moved around the axis of rotation of the wheel 18. Moreover it can be seen that the work carriers are adjustable in many respects and these adjustments can be made simply and easily. The loading mechanism, being attached directly to the footstock, is also conveniently movable along the table 13 wtih the footstock 17 which is of a standard clamp on type that is movably adjustable along the table 13. The footstock 17 includes a pair of clamp members 63 and 64 which are identical in form to the clamp members 58 and 61 on the retaining units and these can be released to free the footstock 17 for movement along the table 13. Thus the whole loading mechanism is movable transversely relative to the grinding wheel 14 when it is desired to alter the position of the loading mechanism relative to that wheel. As in most standard center type grinders the headstock unit 16 is similarly adjustable along the table 13 in the same manner as the footstock 17 is adjustable. The total effect of the described adjustments provides a work loading and unloading mechanism for the grinder described that is more versatile and which can be adjusted to handle a variety of parts with less trouble and in a shorter time with fewer required unique parts than has been possible with the loaders known heretofore.

The provision in the loading mechanism of free access to the area inside the path of the workpieces 15 on either side of the wheel 18 allows for the operation of the loader mechanism with the in-process gauge 21 in an improved manner. The gauge unit 21 can be independently mounted and yet can cooperate very closely with the loading mechanism. As shown, the gauge unit 21 is attached to a pair of rods 22 which extend laterally outward from the headstock 16. Thus the gauge unit 21 is positioned closely adjacent to wheel 18 and inside the path traced by the workpieces 15 as shown in FIG. 3. The gauge unit 21 is a standard jump on type gauge unit and includes a piston rod 65 which can be advanced outward from the unit 21 such that a pair of calipers 66 and 67 span a workpiece 15 as it is being ground by the wheel 14. The piston rod 65 is then retractable into the unit 21 to withdraw the calipers 66 and 67 from the workpiece to allow the next workpiece to be indexed down to the grinding position and the previously ground workpiece to be moved downward and away from the grinding wheel 14. A gauge unit similar to the gauge unit 21 with its jump on calipers 66 and 67 is shown in U.S. Patent 3,037,332. Since gauge units of this type are well known in the art, further detailed description herein is not necessary. It should be pointed out that the gauge unit 21 might also be supported from the footstock unit 17 on the other side of the wheel 18 should the shape of the parts 15 so dictate. As shown, however, the diameter portion 68 of the workpieces 15 is being operated on by the wheel 14 and, with the gauge unit in the position on the left side of the wheel 18 as viewed in FIG. 2, the diameter portion 68 is readily measurable by the gauge unit 21 while that portion is being ground. It can also be seen that free access is provided for the operator to the gauge unit 21 for any adjustment and setting thereof or for any service that might need to be performed on that gauge unit. In addition the operator's view of the workpiece is relatively unimpaired by either the loader mechanism described or the gauge unit 21. This is particularly advantageous since the operator must occasionally look at the workpiece even in an automated grinding operation to see that the wheel is providing the required grinding action.

The operation of the motor 27 in the indexing mechanism which rotates the wheel 18 of the loading mechanism can be best explained with reference to the schematic showing in FIG. 4. The cam 45 which is attached to the shaft 35 is shown with the control unit 46 in some detail. The control unit 46 is comprised of a plurality of sections as shown, one section of which comprises a cylinder 68' in which a piston 69 is slidably received. A piston rod 70 is connected through the piston 69 and moves axially therewith. The rod 70 has a roller 71 connected at one end thereof and the roller 71 engages the cam 45 to roll around the periphery thereof. The piston rod 70 also operates a plunger in a valve 72 to control the flow of fluid through that valve 72. The rod 70 further extends through the valve 72 and is adapted to operate a pair of signal devices 73 and 74 which can be standard limit switches, the operation of these being achieved by a pair of operators 75 and 76 secured to the rod 70. The rod 70 is biased by a relatively stiff spring 77 to be held against the cam 45. The cam 45 includes an arcuate notch in the periphery thereof which is of the same radius as the roller 71 so that the spring 77 tends to move the roller 71 into that notch to stop rotation of the cam 45 in a particular angular position. This angular position is repeated at each angular position of the wheel 18 in which a workpiece 15 is placed directly in line with the centers 20 of the headstock unit 16 and footstock unit 17. This is because the gearing between the motor 27 and the wheel 18 is such that the shaft 35 on which the cam 45 is fixed will rotate one full revolution for each angular step movement of the wheel 18.

Figure 4:
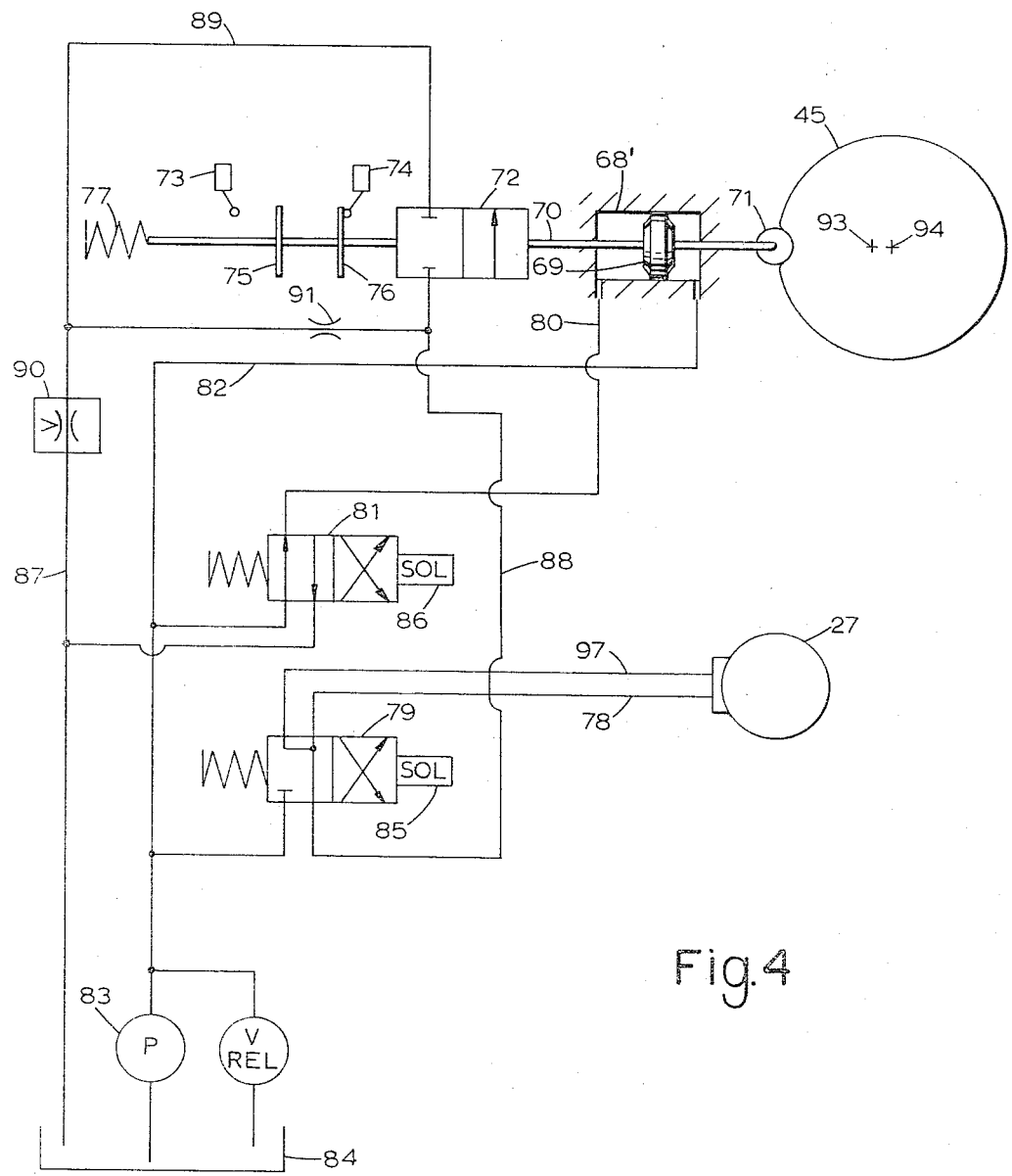
FIG. 4 is a schematic fluid power and control circuit producing the operation of the loading fixture indexing motor.

The circuit of FIG. 4 is shown in the condition in which it would be immediately after the index of the wheel 18 to a set angular position to place one of the workpieces 15 between the center 20. In this condition the motor 27 is shown to have its fluid supply lines 97 and 78 connected directly together in a solenoid operated valve 79. Thus the motor would be free to rotate with very little restraint. However, the roller 71 is shown inserted into the notch in the cam 45 and this roller 71 is held against the cam 45 with considerable pressure so that the engagement of the roller and cam provide a restraint on the indexing mechanism to prevent any movement of the wheel 18. The pressure of engagement by the roller 71 with the cam 45 is provided by the spring 77 as well as by fluid under pressure being connected to the line 80 from a solenoid operated valve 81. Fluid under pressure is also connected to the right side of the piston 69 in the cylinder 68' by the main pressure line 82 which extends directly from the pump 83 at the reservoir 84. The rod 70 is however of larger diameter at the right side of the piston 69 so that the hydraulic force acting on the piston 69 is unbalanced to tend to move the piston 69 and the rod 70 in the rightward direction to aid the spring 77 in holding the roller 71 against the cam 45.

An indexing step of the loading mechanism is initiated by energization of the solenoids 85 and 86 which operate the two valves 79 and 81 respectively. When the solenoid 86 is energized, the valve 81 is shifted to its alternate condition in which the line 80 is connected to the main return line 87 that transmits the fluid freely to the reservoir 84. Therefore pressure on the left side of the piston 69 and the cylinder of 68' is removed and the pressure in the main pressure line 82, being constantly connected to the cylinder 68' at the right side of the piston 69, will cause that piston 69 to shift leftward and to carry the rod 70 with it against the bias of the spring 77. Therefore the restraint on the indexing mechanism provided by the roller 71 when seated in the notch in the cam 45 is removed. At this same time the solenoid 85 has shifted the valve 79 to its alternate state in which the line 97 is connected to a fluid line 88 that extends from the valve 79 to the valve 72 in the control unit. With the rod 70 shifted to the left, the valve portion 72 in the control unit is also shifted to its alternate state and fully connects the line 88 with another fluid line 89 that connects directly to the main return line 87 at the high pressure side of a rate valve 90. Therefore a return path is provided from the line 97 of the motor 27 to the reservoir; the flow of fluid through this line, however, being determined by the setting of the rate valve 90. With the valve 79 in its alternate state, the motor operating line 78 is connected directly to the main pressure line 82. Therefore the motor 27 is caused to be operated to rotate the output shaft 28 and to drive the indexing mechanism to rotate the wheel 18.

The cam 45 is mounted for rotation about an axis 93 which is slightly eccentric from the geometric center 94 of the cam. As shown the axis of rotation 93 of the cam 45 is offset toward the notch in the cam 45 in which the roller 71 is shown seated. In operation of the mechanism in an indexing step the cam is rotated to move the more eccentric portion thereof toward the roller 71. The solenoid 86 is held energized until approximately half way through the rotation of the cam 45 at which time the solenoid 86 is deenergized. At this same time the most eccentric portion of the cam 45 is at the roller 71. Therefore when fluid under pressure is reconnected to the line 80 by the shifting of a valve 81 back to the condition shown, the rod 70 can only move part way back toward the most rightward position which it assumes when the circuit is as shown. The solenoid 85 is not deenergized at this time, however. Therefore the motor 27 continues to operate and the cam 45 continues to be rotated. As the cam 45 is rotated, the rod 70 is allowed to move toward the right and toward the position at which the valve 72 is closed. The connection between the fluid line 88 and the fluid line 89 becomes progressively more restricted causing the rate of operation of the motor 27 to slow. At about the time that the roller 71 is entering back into the notch in cam 45, the operator 76 engages the signal device 74 to produce an electrical signal which causes the deenergization of the solenoid 85 and the shifting of the valve 79 back to the condition shown. The motor 27 is then stopped but is allowed to free wheel since the lines 97 and 78 are again connected together. The force of the spring 77 and the fluid pressure acting on the piston 69 urges the roller down into the notch in the cam 45 with considerable pressure. Since the motor 27 offers no restraint on further rotation of the cam 45 this force produced by the spring and the fluid in the cylinder 68' on the piston 69 will cause the roller 71 to produce a rotational force on the cam 45 to cause it to rotate until the roller 71 is firmly seated in the notch therein. Thus the cam 45 is rotated to the same angular position in which it was located prior to the start of the indexing step. The wheel 18 then is caused to be indexed a fixed amount corresponding to the spacing between the adjacent work carriers on the wheel 18. The rotation of the cam 45 toward its initial angular position and the gradual closing of the valve 72 due to the slow shift of the rod 70 toward the right produces a gradual deceleration in the rate of operation of the motor 27. A shunt path is provided between the line 88 and the line 89 through a fixed resistance 91 so that any pressure build up in the motor 27 can be dissipated during the interval between indexing operations. This path through the resistance 91 also provides a fluid path through which exhaust fluid from the motor 27 can pass should the valve 72 close slightly before the cam has rotated to the point where the switching device 74 is operated and the roller 71 has entered the notch in the cam 45.

From the description of FIG. 4, it can be seen that the power mechanism including the motor 27 and the gearing from the motor 27 to the wheel 18 is operated to provide an angular step movement of the wheel 18. This step movement will be the same each time since the cam 45 is caused to move through exactly one revolution for each time that the motor 27 is energized. The operation of the solenoids 85 and 86 can be accomplished through any conventional means and this electrical circuit is not described in any detail herein.

While the invention has been described in connection with one possible form or embodiment thereof it is to be understood that the present disclosure is illustrative rather than restrictive and that changes and modifications may be made without departing from the spirit of the invention or the scope of the claims which follow.

What is claimed is:
1. An automatic workpiece loader adapted for use with a machine tool having a pair of spaced support units thereon, each having a work holding member extending therefrom toward the other, the work holding members adapted for supporting a workpiece on a work axis extending therebetween, the loader comprising:
 (a) a wheel having a circumferential rim portion,
 (b) means for supporting said wheel between the work support units for rotation on an axis spaced from and parallel to the work axis,
 (c) a plurality of work carriers equispaced around the periphery of said wheel, each carrier extending through said rim portion parallel to the axis of wheel rotation to support a workpiece across the periphery of said wheel and parallel to said work axis at a radial distance from the axis of wheel rotation corresponding to the spacing of the axis of wheel rotation from the work axis,
 (d) releasable means for securing said work carriers in selected positions in the rim portion to permit transverse adjustment of the position in which workpieces are supported relative to said wheel, and
 (e) means for indexing said wheel successively through fixed angular movements to present said work carriers successively to an operating position between the work holding members.
2. The machine tool loader of claim 1 wherein:
 (a) each of said work carriers includes receivers connected at spaced positions thereon and supported in a cantilever manner from said rim portion,
 (b) means are included for detachably connecting said receivers to said work carriers to permit adjustment of the spacing therebetween; and
 (c) an insert is detachably held in each of said receivers having a pocket opening radially outward from said wheel for receipt of a workpiece therein.

3. An automatic workpiece loader adapted for use with a precision grinding machine having a table surface and a pair of spaced support units thereon each having a center extending therefrom toward the other and adapted for rotatably supporting a workpiece on a work axis extending therebetween, the loader comprising:
 (a) a wheel having a circumferential rim portion,
 (b) means for supporting said wheel between the support units and above the table surface for rotation on an axis spaced from and parallel to the work axis,
 (c) a plurality of work carriers equispaced around the periphery of said wheel, each carrier extending transversely through said rim portion in a direction parallel to the work axis to hold a workpiece across the periphery of said wheel and parallel to said work axis at a radial distance from the axis of wheel rotation corresponding to the spacing of the wheel rotation from the work axis,
 (d) releasable means for securing each of said work carriers in a selected position in the rim portion to permit transverse adjustment of the position in which a workpiece is supported relative to said wheel, and
 (e) means for indexing said wheel angularly through a fixed rotation to present said work carriers successively to an operating position between the centers.

4. The grinding machine loader of claim 3 wherein:
 (a) said means for supporting the wheel is an arm extending from the side of one of the support units to one side of the central portion of said wheel,
 (b) said means for indexing is housed in said one support unit from which said arm extends and is connected to the wheel through said arm,
 (c) a retractable in-process gauge unit is provided and is adapted when advanced to measure a workpiece held between the centers, and
 (d) a cantilever support extends from the side of one of said support units to a position adjacent to said wheel to hold said gauge unit in place inside the circular path described by workpieces carried by said work carriers.

References Cited by the Examiner
UNITED STATES PATENTS

| | | | |
|---|---|---|---|
| 2,601,748 | 7/1952 | Lohr | 51—108 |
| 3,037,332 | 6/1962 | Wiatt | 51—165 |
| 3,073,074 | 1/1963 | Price | 51—215 X |

ROBERT C. RIORDON, *Primary Examiner.*
DONALD G. KELLY, *Assistant Examiner.*